United States Patent
Thiriet et al.

(10) Patent No.: US 12,392,254 B2
(45) Date of Patent: Aug. 19, 2025

(54) HYBRID TURBOMACHINE FOR AIRCRAFT WITH AN ACTIVE ACOUSTIC CONTROL SYSTEM

(71) Applicants: SAFRAN HELICOPTER ENGINES, Bordes (FR); SAFRAN ELECTRICAL & POWER, Blagnac (FR); SAFRAN POWER UNITS, Toulouse (FR)

(72) Inventors: Romain Jean Gilbert Thiriet, Moissy-Cramayel (FR); Eric Jean-Louis Bouty, Moissy-Cramayel (FR); Denis Antoine Julien Real, Moissy-Cramayel (FR); Valéry Chau, Moissy-Cramayel (FR)

(73) Assignees: SAFRAN HELICOPTER ENGINES, Bordes (FR); SAFRAN ELECTRICAL & POWER, Blagnac (FR); SAFRAN POWER UNITS, Toulouse (FR)

( * ) Notice: Subject to any disclaimer, the term of this patent is extended or adjusted under 35 U.S.C. 154(b) by 0 days.

(21) Appl. No.: 18/044,056

(22) PCT Filed: Sep. 3, 2021

(86) PCT No.: PCT/FR2021/051517
§ 371 (c)(1),
(2) Date: Mar. 3, 2023

(87) PCT Pub. No.: WO2022/049352
PCT Pub. Date: Mar. 10, 2022

(65) Prior Publication Data
US 2023/0258129 A1     Aug. 17, 2023

(30) Foreign Application Priority Data
Sep. 4, 2020   (FR) ...................................... 2009010

(51) Int. Cl.
*F02C 7/045*   (2006.01)
*B64D 27/10*   (2006.01)
(Continued)

(52) U.S. Cl.
CPC .............. *F02C 7/045* (2013.01); *B64D 27/10* (2013.01); *B64D 27/24* (2013.01); *B64D 33/02* (2013.01);
(Continued)

(58) Field of Classification Search
None
See application file for complete search history.

(56) References Cited

U.S. PATENT DOCUMENTS 4,044,203 A     8/1977  Swinbanks
5,511,127 A *   4/1996  Warnaka ........... G10K 11/17857
                                              381/71.7
(Continued)

FOREIGN PATENT DOCUMENTS

CN    107407170 A    11/2017
CN    107976317 A    5/2018
(Continued)

OTHER PUBLICATIONS

Maier et al., "Active control of fan noise from aircraft engines" 7th AIAA/CEAS Aeroacoustic Conference, Maastricht, Netherlands, May 28-30, 2001, https://doi.org/10.2514/6.2001-2220.
(Continued)

*Primary Examiner* — Gerald L Sung
*Assistant Examiner* — Jacek Lisowski
(74) *Attorney, Agent, or Firm* — Bookoff McAndrews, PLLC

(57) ABSTRACT

Hybrid turbomachine comprising an electric generator, a gas generator-equipped with an air inlet and with an exhaust and an acoustic monitoring system comprising a control unit and a plurality of loudspeakers.

(Continued)

At least a first loudspeaker is disposed on the electric generator, and/or at least a second loudspeaker is disposed on the air inlet of the gas generator, and/or at least a third loudspeaker is disposed on the exhaust of the gas generator. The control unit of the acoustic monitoring system is mounted on the electric generator and is configured to make an AC-DC electrical conversion of the electromotive force of the electric generator into an adjustable DC voltage intended to be distributed to loads or to energy storage means.

13 Claims, 2 Drawing Sheets

(51) Int. Cl.
    *B64D 27/24*     (2006.01)
    *B64D 33/02*     (2006.01)
    *F01D 15/10*     (2006.01)
    *H04R 29/00*     (2006.01)
    *B64D 27/02*     (2006.01)

(52) U.S. Cl.
    CPC ........... *F01D 15/10* (2013.01); *H04R 29/001* (2013.01); *B64D 27/026* (2024.01); *B64D 2033/0206* (2013.01); *F05D 2260/962* (2013.01); *F05D 2270/333* (2013.01)

(56) References Cited

U.S. PATENT DOCUMENTS

| | | |
|---|---|---|
| 2001/0023582 A1 | 9/2001 | Nagel |
| 2004/0200215 A1* | 10/2004 | Woollenweber ...... F04D 29/059 60/407 |
| 2014/0016790 A1* | 1/2014 | Loud ................ G10K 11/17825 381/57 |
| 2014/0291987 A1* | 10/2014 | Dooley .................. H02K 16/04 290/34 |
| 2017/0260871 A1* | 9/2017 | Schmidt ............ G01N 29/4427 |
| 2018/0094536 A1 | 4/2018 | Crothers et al. |
| 2018/0301136 A1 | 10/2018 | Nguyen et al. |
| 2019/0061932 A1* | 2/2019 | Kita ....................... B64D 27/02 |
| 2020/0072130 A1 | 3/2020 | Smith |

FOREIGN PATENT DOCUMENTS

| | | |
|---|---|---|
| CN | 108071495 A | 5/2018 |
| EP | 3693268 A1 | 8/2020 |
| JP | 2001193479 A | 7/2001 |
| JP | 2006046157 A1 | 2/2006 |

OTHER PUBLICATIONS

Pardowitz et al., "Core noise—Identification of broadband noise sources of a turbo-shaft engine" German Aerospace Center (DLR). 20th AIAA/CEAS Aeroacoustics Conference; Session: Turbomachinery and Propeller Noise, Jun. 13, 2014, https://doi.org/10.2514/6.2014-3321.

Search Report and Written Opinion issued in International Application No. PCT/FR2021/051517 on Dec. 22, 2021 (15 pages).

Search Report reported in French Application No. 2009010 on May 17, 2021 (2 pages).

The First Office Action issued in corresponding Chinese Application No. 2021800505146, issued Apr. 8, 2025.

* cited by examiner

[Fig. 1]

HYBRID TURBOMACHINE FOR AIRCRAFT WITH AN ACTIVE ACOUSTIC CONTROL SYSTEM

CROSS-REFERENCE TO RELATED APPLICATIONS

This patent application is a U.S. National Stage entry of International Application No. PCT/FR2021/051517, filed on Sep. 3, 2021, which claims the benefit of priority to French Application No. 2009010, filed on Sep. 4, 2020.

TECHNICAL FIELD

The invention relates to the field of aircraft propulsion system noise, and more particularly to an active acoustic monitoring for a hybrid turbogenerator of an aircraft such as a vertical take-off aircraft.

PRIOR ART

The rise of the new market for flying urban taxis requires electrically distributed propulsion architectures known as series hybrid architectures, that is to say combining both two distinct propulsion sources: a turbogenerator composed of a turbomachine and a generator, and a battery pack.

The democratization of this type of aircraft in large urban centers cannot be achieved without the demonstration of an optimized acoustic signature on the turbogenerator.

The noise sources of a turbogenerator are: the rolling noise, the tone noise, as well as the combustion noise and the turbine noise. The rolling noise is the noise emitted by the generator driven at high speed by the turbomachine. It is generated on the one hand by the vibrations of the rotating assemblies, on the other hand by the internal contacts at the rolling. The tone noise linked to the compressor corresponds to the noise emitted by the air inlet of the turbogenerator. The combustion noise and the turbine noise correspond to the noise emitted by the exhaust of the turbogenerator (broadband noise).

The principle of the active acoustic monitoring has long been known. However, its application to turbomachines faces two essential problems: the complexity of the acoustic field to be attenuated, and the on-board mass necessary for an efficient operation.

For a turbomachine configured as a turbogenerator, the proximity of the different elements and in particular of an electrical power source allows, at a lower cost, hosting a monitoring system as close as possible to the generator and addressing the problem of the mass penalty.

As explained in the article entitled "Identification of broadband noise sources of a turbo-shaft engine" by Ulf Tapken et al. (AIAA-2014-3321), the monitoring of the broadband noise of the ejection can be made with a simple system comprising for example a loudspeaker, a microphone and an integrated single-channel controller with feedback monitoring. Such a system allows a noise monitoring up to about 1,500 Hz with good attenuation, that is to say greater than 15 dB, because its spatial structure is very simple.

The monitoring of the tone of the compressor requires the use of multiple loudspeakers, and therefore the use of a multi-channel system as indicated in the article entitled "Active Control of Fan Tone Noise from Aircraft Engines" by R. Maier et al. ($7^{th}$ AIAA/CEAS Aeroacoustics Conference, 28-30 May 2001).

For several years, there have been boxes onboard an aircraft equipped with turboprops to actively reduce the noise perceived in the cabin. These systems are heavy.

DISCLOSURE OF THE INVENTION

The invention aims to propose a solution for monitoring the acoustic noise emitted by a turbogenerator by limiting the mass relating to the acoustic monitoring system.

In one object of the invention, there is proposed a hybrid turbomachine comprising an electric generator, a gas generator equipped with an air inlet and with an exhaust and an acoustic monitoring system comprising a control unit and a plurality of loudspeakers.

According to a general characteristic of the invention, at least a first loudspeaker is disposed on the electric generator, and/or at least a second loudspeaker is disposed on the air inlet of the gas generator, and/or at least a third loudspeaker is disposed on the exhaust of the gas generator.

The acoustic monitoring system thus allows actively attenuating the noise generated by the hybrid turbomachine perceived on the ground and in the cabin. The sound waves emitted by the loudspeakers of the system generate acoustic waves intended to produce acoustic waves which compensate for, or even cancel, the waves generated by the turbomachine.

Preferably, the acoustic monitoring system comprises at least a first loudspeaker disposed on the electric generator, and at least a second loudspeaker disposed on the air inlet of the gas generator, and at least a third loudspeaker disposed on the exhaust of the gas generator.

A configuration with loudspeakers at the same time on the electric generator, on the air inlet and on the exhaust allows maximizing the sound reduction.

According to a first aspect of the hybrid turbomachine, the acoustic monitoring system can comprise at least a first microphone disposed on the electric generator and associated with said at least a first microphone, and/or at least a second microphone disposed on the air inlet of the gas generator and associated with said at least a second microphone, and/or at least a third microphone disposed on the exhaust of the gas generator and associated with said at least a third microphone, the acoustic monitoring system further comprising a monitoring module configured to determine, for each loudspeaker, a signal to be emitted to the loudspeaker as a function of the positioning of the loudspeaker and of the signal collected by said at least one microphone with which it is associated.

According to a second aspect of the hybrid turbomachine, the turbomachine can comprise at least one air inlet duct defining the air inlet of the gas generator and at least one exhaust duct defining the exhaust of the gas generator, said at least a second loudspeaker being fixed on a wall of said at least one air inlet duct, and said at least a third loudspeaker being fixed on a wall of said at least one exhaust duct.

According to a third aspect of the hybrid turbomachine, said at least a second microphone can be fixed on a wall of said at least one air inlet duct, and said at least a third microphone being fixed on a wall of said at least one exhaust duct.

According to a fourth aspect of the hybrid turbomachine, the control unit of the acoustic monitoring system can comprise analog amplifiers equipped with analog-digital converters for emitting processed signals to the loudspeakers and collecting signals from the microphones, and digital controllers of the programmable logic array or digital signal processor type for acquiring and processing the digital signals.

According to a fifth aspect of the hybrid turbomachine, the control unit of the acoustic monitoring system can further comprise a database including simple noise models generated as a function of the operating parameters of the turbomachine, and a determination module configured to determine, for each loudspeaker, a signal to be emitted to the loudspeaker as a function of the operating parameters of the turbomachine and as a function of the positioning of the loudspeaker.

The database can be used in a configuration of the acoustic monitoring system devoid of any microphone to lighten the system and thus the turbomachine, the system operating from a noise predictive system based on pre-recorded models and operating parameters of the turbomachine.

The database can also be used in a configuration of the acoustic monitoring system equipped with microphones, the database being used in the event of failure of a microphone.

According to a sixth aspect of the hybrid turbomachine, the hybrid turbomachine can comprise a wired communication between the control unit and the loudspeakers.

In one variant, the hybrid turbomachine can comprise a wireless communication between the control unit and the loudspeakers.

According to a seventh aspect of the hybrid turbomachine, the control unit of the acoustic monitoring system can be mounted on the electric generator.

The mounting of the control unit of the acoustic monitoring system on the electric generator thus allows reducing the length of the connections and thus reducing the total mass of the system.

According to an eighth aspect of the hybrid turbomachine, the control unit can be further configured to make an AC-DC electrical conversion of the electromotive force of the electric generator into an adjustable DC voltage intended to be distributed to loads or to energy storage means.

Thanks to its configuration for making an AC-DC electrical conversion of the electromotive force of the electric generator into an adjustable DC voltage intended to be distributed to loads or to energy storage means, the control unit can comprise at the same time the functions of an Active Rectifier Control Unit or ARCU and the control functions of the acoustic processing unit.

Furthermore, the control unit can also be configured to perform at least one additional function among at least one conversion of a power source, one acquisition of data relating to the electric generator and one management of the low-voltage power supply for powering a control stage.

According to a ninth aspect of the hybrid turbomachine, the acoustic monitoring system can be integrated into a control system of the electric generator.

According to a tenth aspect of the hybrid turbomachine, the electric generator can be a reversible electric machine.

The electric generator thus allows a bidirectional conversion of the mechanical-electrical energy, that is to say a mechanical-electrical conversion and an electrical-mechanical conversion. The electric generator can generate a polyphase, for example a three-phase, electric current. The electric generator can thus be a motor-generator configured to operate both in generator mode under first conditions and in motor mode under second conditions. The electric generator can be a synchronous or asynchronous electric machine.

In another object of the invention, there is proposed an aircraft comprising an Electronic Engine Control Unit of the aircraft and at least one turbomachine as defined above and associated with or integrated into said Electronic Engine Control Unit of the aircraft, also known under the acronym EECU.

Said Electronic Engine Control Unit can be integrated into a Full Authority Digital Engine Control of the turbomachines of the aircraft, also known under the anonymous FADEC.

The hybrid turbomachine can further comprise an aircraft control system mainly including a fuel system configured to pump fuel into a tank of the aircraft and to inject it into the combustion chamber of the aircraft as well as said aircraft Electronic Engine Control Unit (EECU).

According to one aspect of the aircraft, the turbomachine control unit can be configured to ensure the management of measurements provided by sensors and a command of a starting system from a module for managing the on-board network of the aircraft.

The control unit can be further configured to monitor parameters of the engine such as the fuel flow rate based on a rotational speed of the gas generator or of the electric generator and other parameters, such as the frequency of the electric generator or an anticipation of the load for each electric propulsion chain. The control unit can be configured to monitor a fuel flow rate supplying the turbomachine based on a rotational speed of the gas generator or of the electric generator, on the frequency of the electric generator or on a load anticipation for each electric propulsion chain.

DESCRIPTION OF THE EMBODIMENTS

Figure 1:
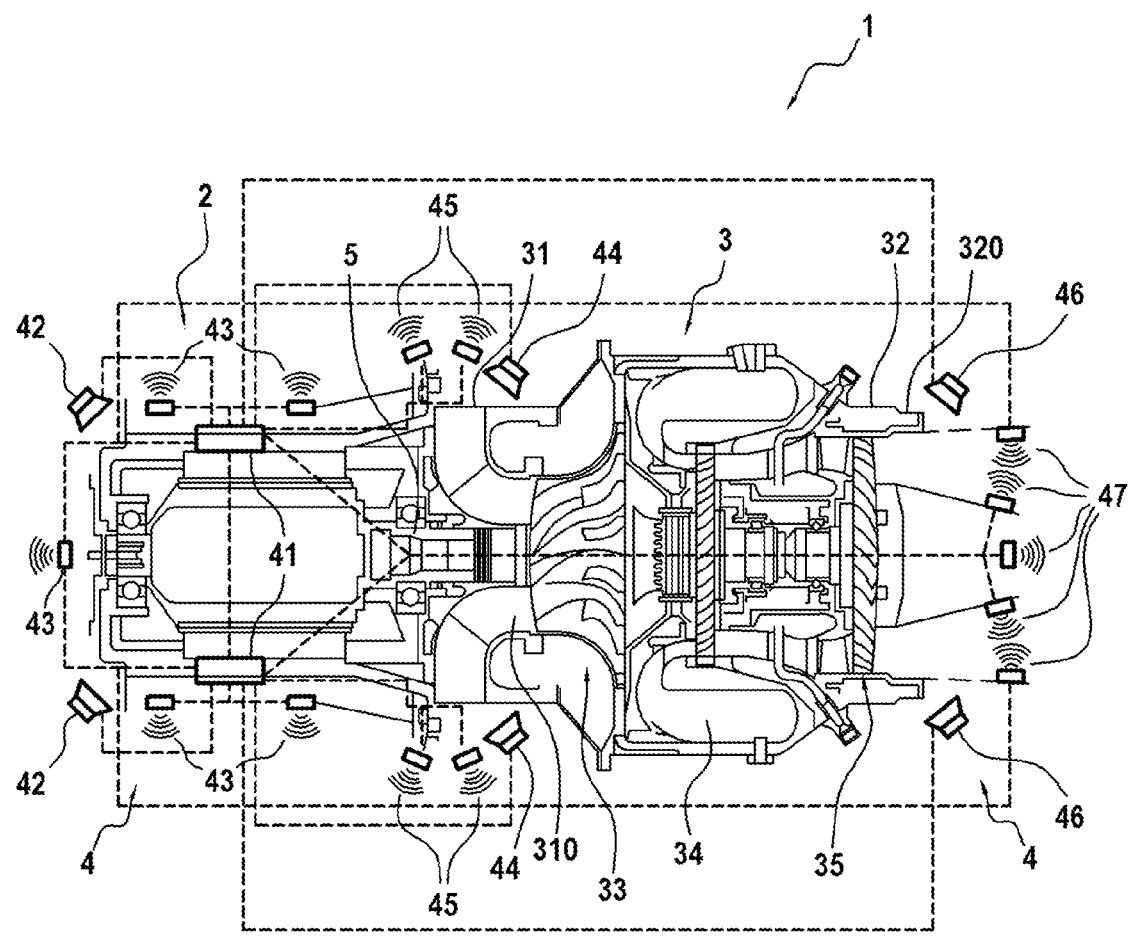
FIG. 1 is a schematic sectional view of a hybrid turbomachine according to one embodiment of the invention.

FIG. 1 schematically represents a sectional view of a hybrid turbomachine 1 according to one embodiment of the invention.

The hybrid turbomachine 1 comprises an electric generator 2, a gas generator 3 and an acoustic monitoring system 4. The electric generator 2 is mechanically connected to the gas generator 3 via a mechanical shaft 5.

The electric generator is a reversible electric machine. It thus allows a bidirectional conversion of the mechanical-electrical energy, that is to say a mechanical-electrical conversion and an electrical-mechanical conversion. The electric generator can generate a three-phase electric current.

The gas generator 3 comprises an air inlet 31, an exhaust 32, at least one compression stage 33, a combustion stage 34 and at least one turbine stage 35 ejecting hot air via the exhaust 32.

The air inlet 31 includes at least one air inlet duct 310 defining the air inlet 31 of the gas generator 3 and an exhaust duct 320 defining the exhaust 32 of the gas generator 3.

In the exemplary embodiment illustrated in FIG. 1, the acoustic monitoring system 4 comprises a control unit 41 mounted on the electric generator 2, two first microphones 42 and four first loudspeakers 43 disposed around the electric generator 2, two second microphones 44 and four second loudspeakers 45 disposed on the air inlet 31 of the gas generator 3, and two third microphones 46 and five third loudspeakers 47 disposed on the exhaust 32 of the gas generator 3. The control unit 41 is electrically coupled to the microphones 42, 44 and 46 and to the loudspeakers 43, 45 and 47 by electric cables making it possible to make a wired connection for the transmission of the signals.

The loudspeakers and the microphones can be of the piezoelectric, electrodynamic or plasma type.

Figure 2:
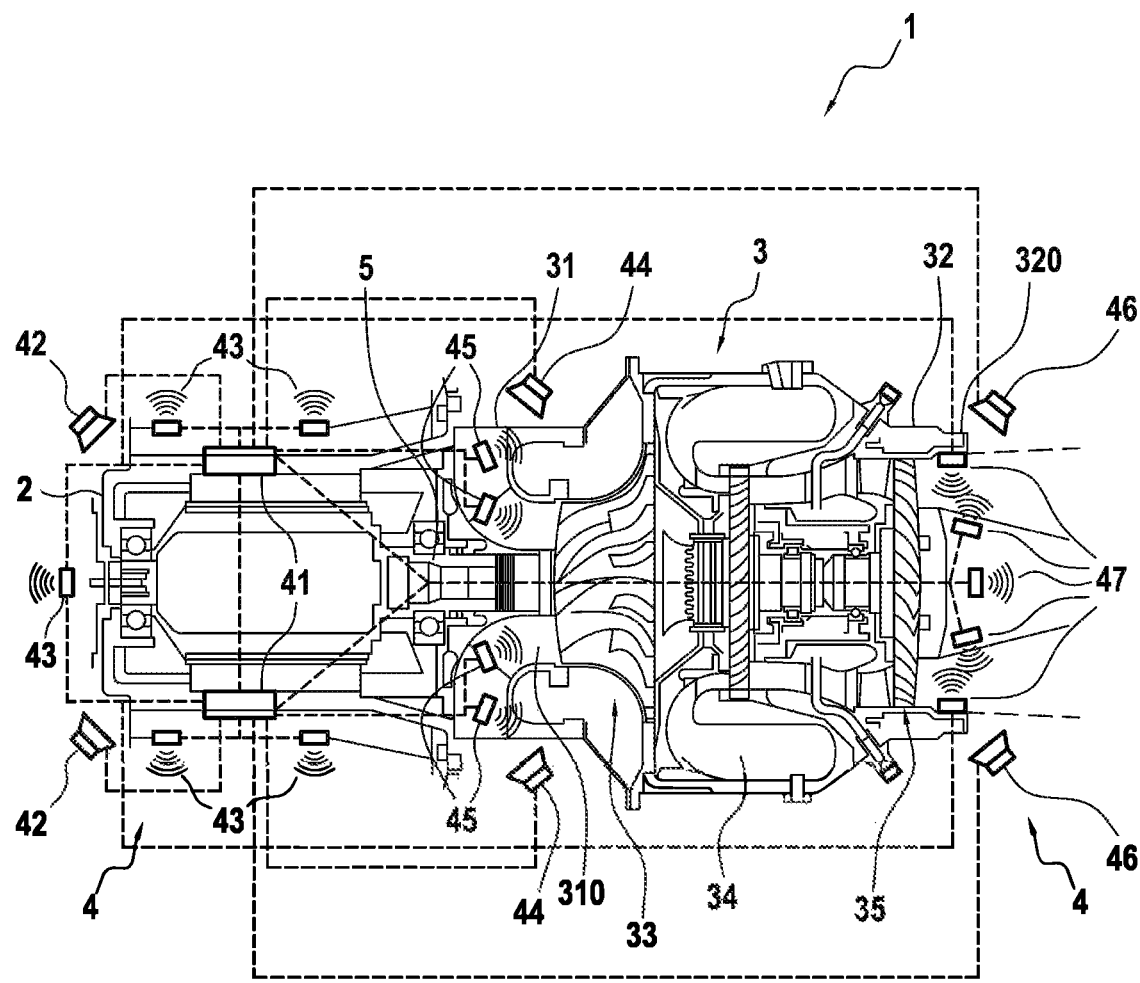
FIG. 2 is a schematic sectional view of a hybrid turbomachine according to one embodiment of the invention.

More specifically, the first loudspeakers 43 and the first microphones 42 are fixed on the electric generator 2 or on a casing inside which the electric generator 2 is housed. As shown in FIG. 2, the second microphones 44 and the second loudspeakers 45 are fixed on the air inlet ducts 310 and the third microphones 46 and the third loudspeakers 47 are fixed on the exhaust duct 320.

The control unit 41 of the acoustic monitoring system 4 comprises analog amplifiers equipped with analog-digital converters for emitting processed signals to the loudspeakers 43, 45 and 47 and collecting signals from the microphones 42, 44 and 46, and digital controllers of the programmable logic array or digital signal processor type for acquiring and processing the digital signals.

The control unit 41 of the acoustic monitoring system comprises a monitoring module configured to determine, for each loudspeaker 43, 45 and 47, a signal to be emitted to the loudspeaker as a function of the positioning of the loudspeaker and of the signal collected by the microphone 42, 44 and 46 with which it is associated.

To deal with the possibility of a failure of one of the microphones 42, 44, 46, the control unit 41 of the acoustic monitoring system 4 further comprises a database including simple noise models generated as a function of the operating parameters of the turbomachine 1, and a determination module configured to determine, for each loudspeaker 43, 45 and 47, a signal to be emitted to the loudspeaker as a function of the operating parameters of the turbomachine 1 and as a function of the positioning of the loudspeaker.

The acoustic monitoring system 4 thus allows actively attenuating the noise generated by the hybrid turbomachine 1 and perceived on the ground and in the cabin. The sound waves emitted by the loudspeakers 43, 45 and 47 of the system 4 generate acoustic waves in phase opposition with the waves picked up by the microphones 42, 44 and 46 to generate destructive interference with the waves generated by the turbomachine 1.

The turbomachine 1 is intended to be mounted on an aircraft comprising an Electronic Engine Control Unit of the aircraft also known under the acronym EECU. The turbomachine 1 is either associated with or integrated into the Electronic Engine Control Unit of the aircraft. The Electronic Engine Control Unit is preferably integrated into a Full Authority Digital Engine Control of the turbomachines of the aircraft also known under the acronym FADEC.

Furthermore, the control unit 41 of the turbomachine 1 is configured to ensure the management of measurements provided by sensors and a command of a starting system from a module for managing the on-board network of the aircraft.

The control unit 41 is configured to monitor a fuel flow rate supplying the turbomachine 1 based on a rotational speed of the gas generator 3 or of the electric generator 2, on the frequency of the electric generator 2 or on a load anticipation for each electric propulsion chain.

The invention claimed is:

1. A hybrid turbomachine comprising an electric generator, a gas generator equipped with an air inlet and with an exhaust and an acoustic monitoring system comprising a control unit, a plurality of microphones and a plurality of loudspeakers configured to emit noise-attenuating acoustic waves;

wherein at least a first microphone of the plurality of microphones is directly connected to the electric generator;

wherein at least a first loudspeaker of the plurality of loudspeakers is positioned proximately to the electric generator, and at least a second loudspeaker of the plurality of loudspeakers is positioned proximately to the air inlet of the gas generator and/or at least a third loudspeaker of the plurality of loudspeakers is positioned proximately to the exhaust of the gas generator;

wherein the control unit of the acoustic monitoring system is mounted on the electric generator and configured to make an AC-DC electrical conversion of an electromotive force of the electric generator into an adjustable DC voltage intended to be distributed to loads or to energy storage means, wherein the control unit of the acoustic monitoring system further comprises a database including noise models generated as a function of operating parameters of the hybrid turbomachine, and a determination module configured to determine, for each loudspeaker of the plurality of loudspeakers, a respective first signal to be emitted, in response to a failure of one of the plurality of the microphones, based on the noise models to the respective loudspeaker as a function of i) the operating parameters of the hybrid turbomachine and ii) the positioning of the respective loudspeaker; and wherein the acoustic monitoring system attenuates noise generated by the hybrid turbomachine by emitting acoustic waves from the plurality of loudspeakers, wherein the acoustic waves emitted from the plurality of loudspeakers are in phase opposition with acoustic waves received by the plurality of microphones.

2. The hybrid turbomachine according to claim 1, wherein the first microphone of the plurality of microphones is associated with the at least a first loudspeaker, and/or at least a second microphone of the plurality of microphones is positioned proximately to the air inlet of the gas generator and associated with the at least a second loudspeaker, and/or at least a third microphone of the plurality of microphones is positioned proximately to the exhaust of the gas generator and associated with the at least a third loudspeaker, the control unit of the acoustic monitoring system further comprising a monitoring module configured to determine, for each loudspeaker of the plurality of loudspeakers, a respective second signal to be emitted to the respective loudspeaker as a function of the positioning of the respective loudspeaker and of a respective third signal collected by the at least one microphone with which the respective loudspeaker is associated.

3. The hybrid turbomachine according to claim 1, comprising at least one air inlet duct defining the air inlet of the gas generator and at least one exhaust duct defining the exhaust of the gas generator, the at least a second loudspeaker being fixed on a wall of the at least one air inlet duct, and the at least a third loudspeaker being fixed on a wall of the at least one exhaust duct.

4. The hybrid turbomachine according to claim 3, wherein the at least a second microphone is fixed on the wall of the at least one air inlet duct, and the at least a third microphone is fixed on the wall of the at least one exhaust duct.

5. The hybrid turbomachine according to claim 2, wherein the control unit of the acoustic monitoring system comprises analog amplifiers equipped with analog-digital converters for emitting the first signals to the plurality of loudspeakers and collecting the second signals from the plurality of microphones, and digital controllers of a programmable logic array or digital signal processor type for acquiring and processing digital signals.

6. The hybrid turbomachine according to claim 1, comprising a wired communication between the control unit and the plurality of loudspeakers.

7. The hybrid turbomachine according to claim 1, comprising a wireless communication between the control unit and the plurality of loudspeakers.

8. The hybrid turbomachine according to claim 1, wherein the acoustic monitoring system is integrated into a control system of the electric generator.

9. The hybrid turbomachine according to claim 1, wherein the electric generator is a reversible electric machine.

10. An aircraft comprising an Electronic Engine Control Unit of the aircraft and at least one hybrid turbomachine according to claim 1 associated with or integrated into the Electronic Engine Control Unit of the aircraft.

11. The aircraft according to claim 10, wherein the Electronic Engine Control Unit is integrated into a Full Authority Digital Engine Control of the hybrid turbomachine of the aircraft.

12. The aircraft according to claim 10, wherein the control unit is configured to ensure a management of measurements provided by sensors and a command of a system for starting the hybrid turbomachine from a module for managing an on-board network of the aircraft.

13. The aircraft according to claim 10, wherein the control unit is configured to monitor a fuel flow rate supplying the hybrid turbomachine based on a rotational speed of the gas generator or of the electric generator, on a frequency of the electric generator or on a load anticipation for each electric propulsion chain.

* * * * *